UNITED STATES PATENT OFFICE.

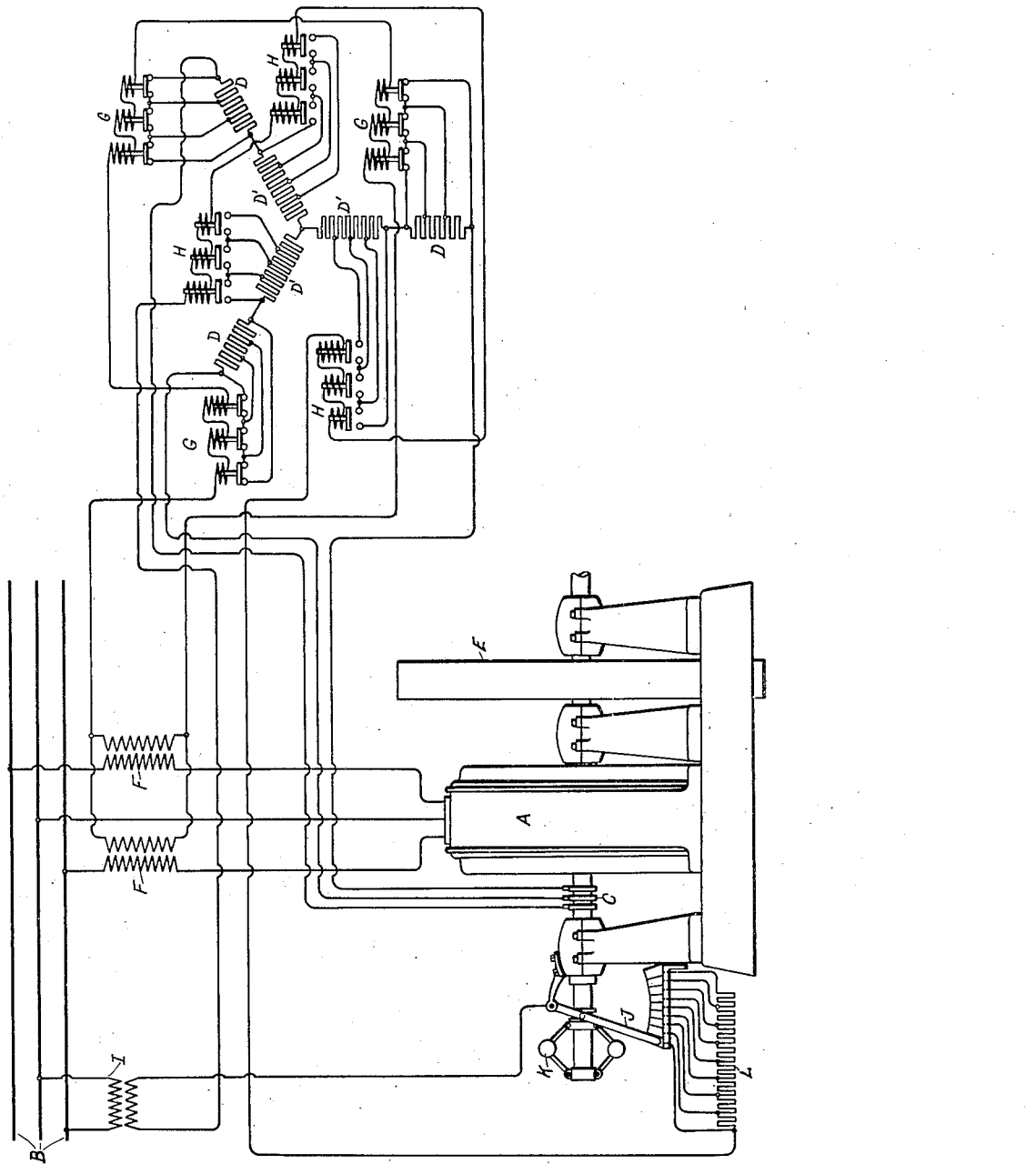

KARL A. PAULY, OF SCHENECTADY, NEW YORK, ASSIGNOR TO GENERAL ELECTRIC COMPANY, A CORPORATION OF NEW YORK.

MOTOR CONTROL.

No. 876,993.

Specification of Letters Patent.

Patented Jan. 21, 1908.

Application filed May 18, 1907. Serial No. 374,422.

*To all whom it may concern:*

Be it known that I, KARL A. PAULY, a citizen of the United States, residing at Schenectady, county of Schenectady, State of New York, have invented certain new and useful Improvements in Motor Control, of which the following is a specification.

My invention relates to the automatic control of electric motors, and particularly to electric motors for operating rolling mills.

Owing to the great and sudden variations of load to which motors are subjected in driving rolling mills, such motors have been provided heretofore with fly-wheels to enable the motor to meet the sudden load demands without the excessive variations in current which would otherwise occur; and, in order to cause the fly-wheel to act effectively, means have been provided for cutting resistance into the motor-circuit when the motor current increased above a certain limit, so as to cause the motor to reduce its speed slightly and allow the fly-wheel to give up the energy required for handling the momentary overload. When an induction motor is employed, the resistance is placed in the secondary circuit of the rotor.

It is sometimes desirable to operate a rolling mill at a reduced speed,—that is, at a speed considerably less than that at which the motor would drive the mill when running idle; or, in the case of an induction motor, at a speed considerably less than synchronism. This may be accomplished by the insertion of resistance in the motor circuit, but if the devices actuated by the motor-current are depended on for this resistance, then when no steel is in the rolls the motor-speed will tend to rise and this would be objectionable, since the speed at which the steel enters the roll materially affects the quality of the product. On the other hand, if the resistance were inserted permanently in the motor-circuit, the speed regulation would be impaired, or in other words, the motor would not be able to carry its full load without an excessive drop in speed, since the resistance must be high enough to keep the motor speed down to the desired value when carrying only the friction load of the mill.

The object of my invention is so to arrange the motor that it may be operated at a reduced speed without either of the disadvantages pointed out above, and consists in providing, in addition to the resistance controlled by the motor-current, a second resistance controlled by the motor-speed. This resistance is cut in automatically, when the motor-speed tends to rise above a certain amount, so as to keep the motor speed nearly constant, and is cut out automatically when the load comes on, so that the speed regulation under load is not affected. By the coöperation of the current-controlled resistances and speed-controlled resistance, the speed of the motor is kept nearly constant, while at the same time the full benefits of the fly-wheel are secured.

My invention will best be understood by reference to the accompanying drawing, which shows diagrammatically a motor arranged in accordance with my invention.

In the drawing, A represents an induction motor, the primary of which is supplied from the three-phase mains B. The secondary or rotor of the motor is connected through collector-rings C to two sets of regulating resistances D D and D' D'.

F F represent series transformers supplying relays G G, which control the resistances D D. The resistances D' are controlled by relays H H, which are supplied from any suitable source of current, such as the shunt transformer I, and are controlled by a switch J, which is actuated by a centrifugal governor K and arranged to include variable portions of a resistance L in circuit with the relays H H.

The several parts are shown in the positions occupied when the motor has been running idle for some time. The centrifugal governor K has moved the switch J, so as to cut out all resistance L from the circuit, so that relays H H are fully energized, and resistances D' D' are in circuit. These resistances are high enough to hold the motor at the desired speed under the friction load of the rolling mill. The motor-current is small, since the motor is running idle, and the relays G G are consequently insufficiently energized to open their contacts and resistances D D are short-circuited. Now, if a piece of steel enters the rolls, the load on the motor is suddenly increased, and, owing to the presence of the resistances D' in the rotor-circuit, the speed of the motor drops; thereby causing the switch J to be moved toward the right by the centrifugal governor, so as to reduce the current flowing through the relays H H by cutting resistance L into circuit.

The relays H H are arranged to drop their contacts consecutively, either by providing them with different numbers of turns, as shown in the drawing, or by otherwise arranging them for the purpose. Consequently, resistances D' D' are short-circuited step-by-step. The increase of current, due to the short-circuiting of resistance D' and the entry of the steel into the rolls, increases the motor-current, and when the current rises above a certain amount, a portion or all of the relays G are sufficiently energized to raise their contacts; thereby inserting resistances D D in the secondary circuit of the motor. The relays G G are also arranged to respond consecutively, so that the resistances D D are cut into circuit step-by-step. The slight reduction of speed caused by cutting resistances D D into circuit causes the fly-wheel to give up a portion of its energy and to assist in carrying the load. As the steel passes out of the rolls, the relays G G again close their contacts, short-circuiting resistances D D, and enabling the motor to store up more energy in the fly-wheel. But as soon as the motor speed reaches a predetermined amount the centrifugal governor K begins to move the switch J toward the left, so as to cut resistance out of circuit, and gradually to increase the energization of the relays H, so as to cut resistances D' D' into circuit again and to prevent a further rise in speed.

It will be understood that I have illustrated my invention diagrammatically, and that in practice any well-known arrangement of the automatic controlling means may be employed.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with an electric motor, speed-controlling means for the motor controlled by the motor speed, and speed-controlling means for the motor controlled by the motor current.

2. In combination with an electric motor, a fly-wheel driven thereby, speed-controlling means for the motor controlled by the motor speed, and speed-controlling means for the motor controlled by the motor current.

3. In combination with an electric motor, a centrifugal governor driven thereby, a resistance in circuit with the motor controlled by said governor, a device responsive to variations in the motor circuit, and a resistance in circuit with said motor controlled by said device.

4. In combination with an electric motor, a fly-wheel driven thereby, a centrifugal governor driven by the motor, a resistance in circuit with the motor controlled by said governor, a device responsive to variations in the motor current, and a resistance in circuit with the motor controlled by said device.

5. In combination with an induction motor, means controlled by the motor speed for varying the resistance in the secondary circuit of said motor, and means controlled by the motor current for varying the resistance in said circuit.

6. In combination with an induction motor, a fly-wheel driven thereby, means controlled by the motor speed for varying the resistance of the secondary circuit of said motor, and means controlled by the motor current for varying the resistance of said circuit.

7. In combination with an induction motor, a centrifugal governor driven thereby, a resistance in the secondary circuit of the motor controlled by said governor, a device responsive to variations in the primary current of said motor, and a resistance in the secondary circuit of said motor controlled by said device.

8. In combination with an induction motor, a fly-wheel driven thereby, a centrifugal governor driven by the motor, a resistance in the secondary circuit of the motor controlled by said governor, a device responsive to variations in the primary current of the motor, and a resistance in the secondary circuit of the motor controlled by said device.

In witness whereof, I have hereunto set my hand this 16th day of May, 1907.

KARL A. PAULY.

Witnesses:
BENJAMIN B. HULL,
HELEN ORFORD.